E. & A. BUTTS.
LOADER.
APPLICATION FILED SEPT. 9, 1909.
1,016,242.
Patented Jan. 30, 1912.
3 SHEETS—SHEET 1.
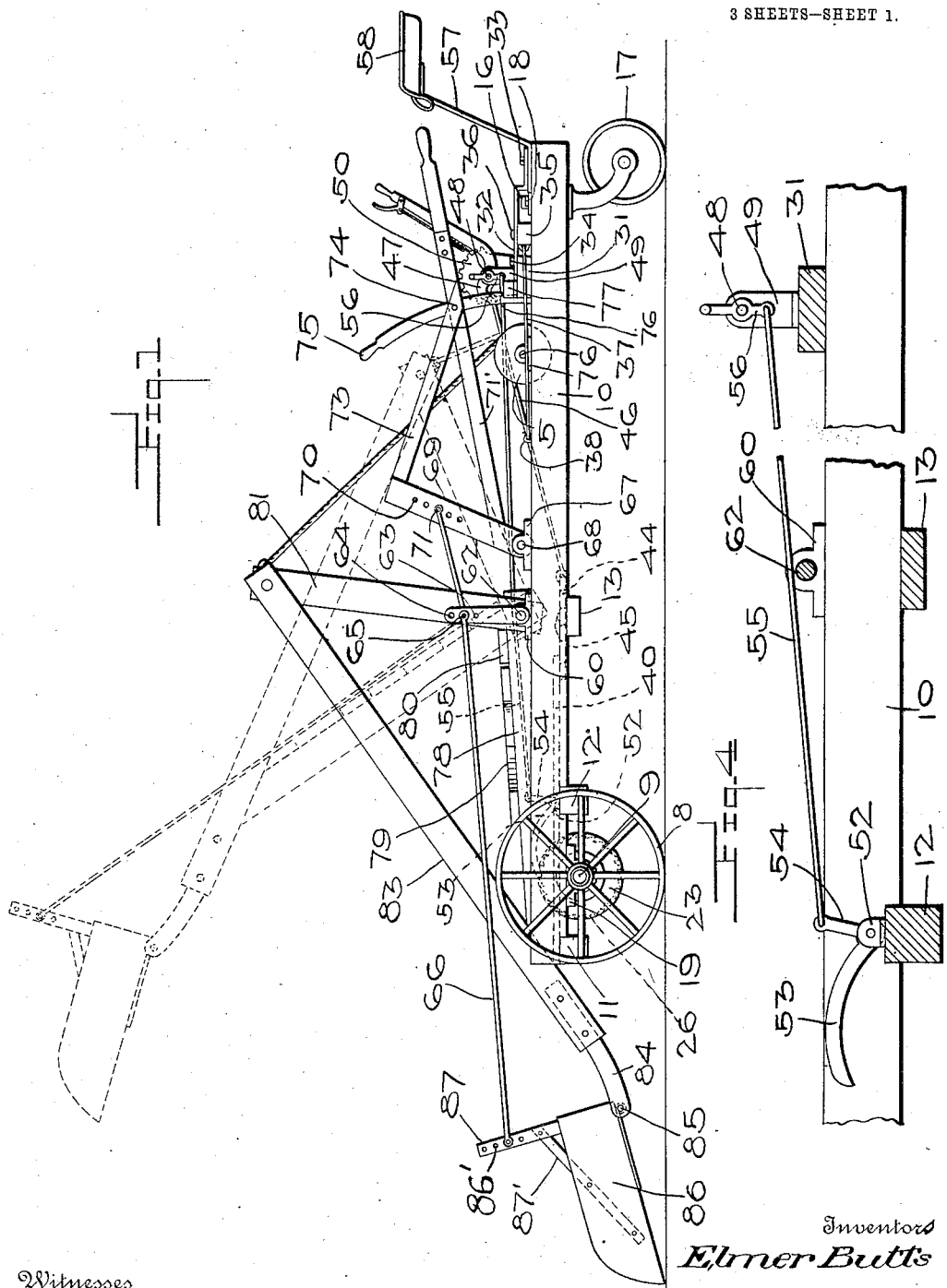
Witnesses
Ed. R. Lusby
M. L. Lowy
Inventors
Elmer Butts
and Albert Butts
By Woodward & Chandler
Attorneys

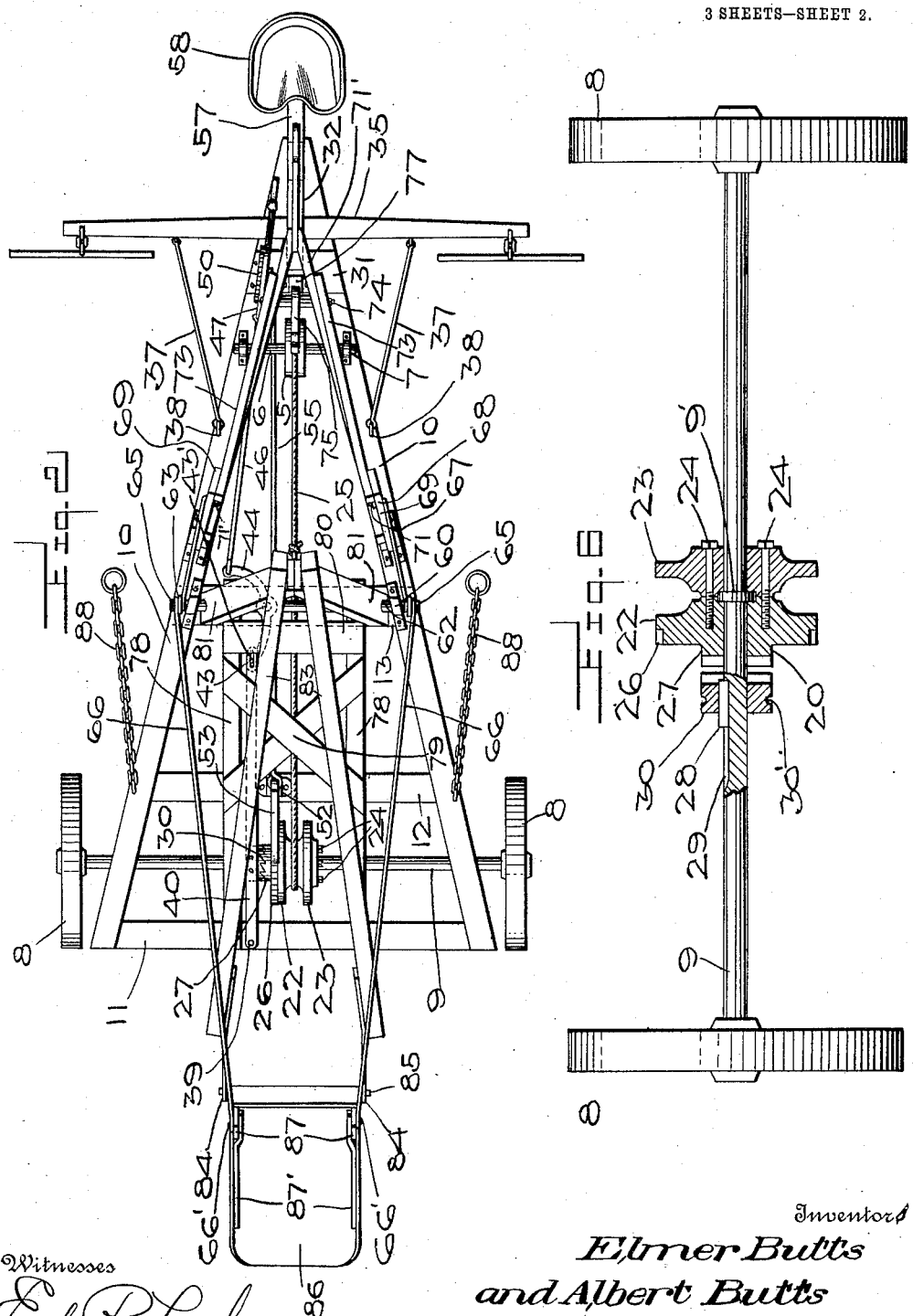

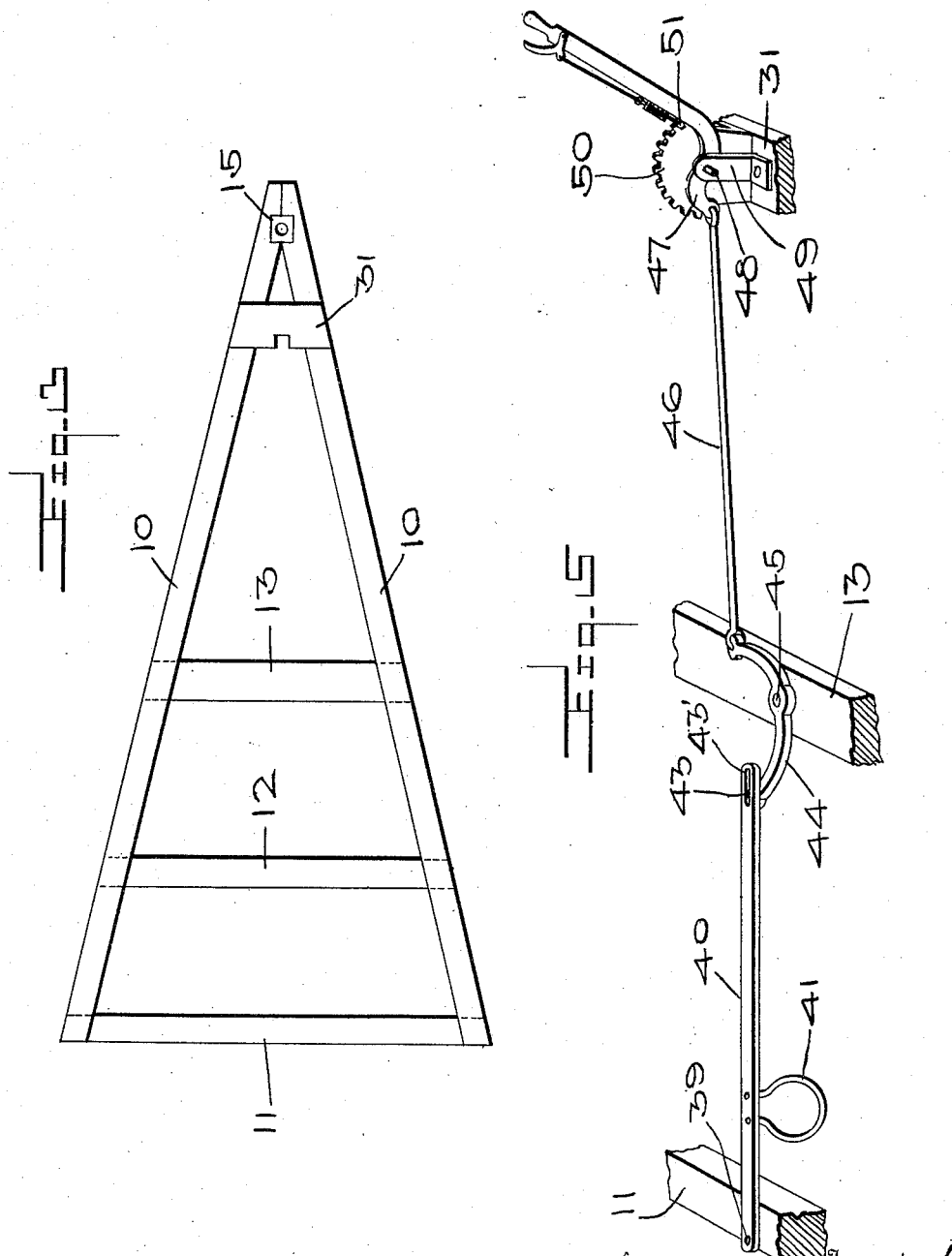

UNITED STATES PATENT OFFICE.

ELMER BUTTS AND ALBERT BUTTS, OF PEABODY, KANSAS.

LOADER.

1,016,242.  Specification of Letters Patent.  Patented Jan. 30, 1912.

Application filed September 9, 1909. Serial No. 516,928.

*To all whom it may concern:*

Be it known that we, ELMER BUTTS and ALBERT BUTTS, citizens of the United States, residing at Peabody, in the county of Marion and State of Kansas, have invented certain new and useful Improvements in Loaders, of which the following is a specification.

This invention has relation to certain new and useful improvements in loaders.

The object of our invention is to provide a loader so constructed that the same may be used in connection with a manure scoop, shovel or hay fork by means of which the material may be gathered, elevated, and then be dumped.

With the above and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 shows a side elevational view of a loader embodying our invention. Fig. 2 shows a top view. Fig. 3 shows a detached detail of the supporting frame. Fig. 4 shows an enlarged detached detail of the foot operated drum releasing mechanism. Fig. 5 discloses an enlarged detail of the clutch operating mechanism. Fig. 6 shows a longitudinal sectional view through the main supporting shaft.

The aim of our invention is to provide a portable, wheel supported frame, having an elevating mechanism so arranged that the machine can be carried through the field to gather the material, and deposit the same into a wagon, feed rack, or upon a stack.

In the accompanying drawings the numeral 10 indicates the two divergently held main supporting sills which at their forward ends are connected by means of the end sill 11, and intermediate of the ends being strengthened by means of the transverse sills 12 and 13. Within the united ends of these sills 10 is held the boxing 15 carrying the stem 16 of the caster wheel 17 this stem being held above by means of the pin 18.

Held within the bearings 19 and within the under surface of the sills 10 is the main operating shaft 9 provided with the supporting wheels 8. This shaft 9 is centrally provided with a collar 9' against which collar are securely clamped the two oppositely located drum members 22 and 23 secured in position by means of the bolts 24, as clearly shown in Fig. 6 of the drawings. As shown a narrow space is provided between these drum members 22 and 23 between which is held the hoisting cable 25. These two drum members 22 and 23 revolve freely about the shaft 9 and one of the drum members as the one marked 22 has the circumscribing ratchet teeth 26, the drum further being provided with the clutch collar 27. Splined to this shaft 9 by means of the key 28 working within the groove 29 is the sliding clutch collar 30 arranged for co-action with the clutch member 27 so that the drum can be connected to the driving shaft 9. The end of the cable 25 is secured to the drum by any suitable means, after passing over the sheave 5, as clearly shown in Fig. 2.

Secured to the rear end of the main sills 10, is the cross bar 31 from which extends a strap 32 secured by means of the bolt 33 at one end and the bolt 34 at the other end. Pivotally held below this strap 32 is the double tree 35 held by means of the king pin 36, and to this double tree 35 are secured the draft animals used in propelling the loader. Extending from the double tree 35 are the two brace rods 37 these brace rods at their forward ends being secured to the staples 38 fastened within the side sills 10. These bars 37 limit the rocking movement of the double tree.

Held to the pin 39 secured within the forward member 11, is the rock lever 40 from which extends the collar 41 in engagement within the groove 30' of the clutch 30. At its rear end this rock lever is slotted as shown at 43' and slidably held within the slot is the pin 43 carried by the curved link 44 which is carried by the pivot pin 45 held within the frame member 13. Extending from the end of this link 44 is the connecting rod 46 which is secured to the lower end of the hand lever 47 which is carried upon the pin 48 held within the ear 49 secured to the frame member 31. This hand lever 47 is provided with the usual rack segment 50 and locking dog 51.

By means of this lever 47 the drum can be thrown into or out of gear with the driving shaft.

Carried upon the transverse frame member 12 is the ear 52 pivotally supporting the pawl 53 having the operating arm 54 from which extends the connecting rod 55 carried to the foot lever 56 this lever also being pivoted upon the pin 48. This pawl 53 is in normal engagement with the ratchet teeth 26 of the drum.

Extending upward from the rear end of the supporting frame, and held by means of the bolt 33 is the seat bracket 57 carrying the seat 58 occupied by the operator.

Held within the bearings 60 secured to the main sills 10 is the supporting shaft 62 which carries the derrick. To the shaft 62 are secured the rock arms 63 having the pin openings 64 arranged to adjustably receive the pin 65 which is carried by one end of the operating bar 66.

Held to the supporting ears 67 by means of the pins 68, are the operating levers employed in tilting the carrying member 86. These operating levers comprise the end members 69 having each a plurality of bolt openings 70 arranged to receive the adjusting bolt 71. The members 69 are carried upon the bolt 68, and extending from these members 69 are the divergently held operating members 71' it being understood that two such members 69 are employed. These operating members or levers 71' are braced by means of the bars 73. Near their forward ends, the levers 71' carry the pin 74 supporting the trip arm 75 having the notch 76 engaging the hood 77 in the form of a metal bar bent U-shaped and secured to the frame member 31.

Held adjacent to the frame member 31, within the bearings 7, is the sheave shaft 6 carrying the sheave 5. The cable 25 is arranged to pass over this sheave 5, and attached to the drum as before stated.

Pivotally held upon the shaft 62 is the derrick as used in our invention. This derrick includes the two parallel held bars 78 strengthened by means of the cross bars 79 and secured at their rear ends by means of the frame bar 80. Extending upwardly from the side members 78 and secured at their upper ends are the two standards 81, and secured at their upper ends to these standards 81 are the carrier bars 83 two such bars being employed, these bars projecting below the members 78 to which they are secured. These carrier bars 83 give support to the scoop, shovel, or fork used in connection with the loader. Extending from the lower ends of these carrier bars are the metallic brackets 84 which carry the shaft 85 giving support to the scoop 86 at its contiguous portion. This scoop has the upstanding arms 87 provided with a plurality of bolt openings 86' arranged to receive a bolt 66' carried by the operating bar 66. The operating bar 66 and the lower frame member 78 are held in parallel spaced relation as shown. The brackets 84 extend downward a suitable distance below the supporting shaft 9, so that the carrying means which may be a scoop or a hay fork can be brought in contact with the surface of the earth at a proper angle.

Extending upwardly from the scoop 86 is the bracket supporting member 87'. The construction is such that when the clutch is thrown into engagement with the main driving wheel, the cable which is secured to the upstanding members 81 is wound about the smallest portion of the drums so that as the winding operation is continued, the diameter of the cable receiving portion of the drum increases.

The draft animals are secured to the double tree and are hitched to the chains 88 secured to the main sill members. The loader is given direction in guiding the horses no steering mechanism being necessary.

As the cable is wound upon the drum, the pawl 53 prevents any retrograde movement. After the scoop or fork has received its load the operator throws in the clutch which carries the derrick upward and when the proper elevation has been attained the clutch is thrown out of contact when the derrick will be held in position by means of the pawl 53. Arriving at the point where the load is to be deposited, which may be a hay cock, feed rack, or stack, the operator actuates the trip 75 resulting in the carrying scoop or other member being tilted to dump the load.

As has been stated the scoop can be removed from the shaft and replaced by means of a hay fork.

The device is light, simple and inexpensive of construction and both durable and efficient in operation.

Having thus described our said invention, what we claim as new and desire to secure by United States Letters Patent is:

The combination with a main frame, of supporting wheels therefor, a triangular frame having a vertex on its base pivoted to the main frame and having its hypotenuse extending downward below the base, a shovel pivoted to the lower end of said extension, said shovel having an upwardly projecting arm, connections between the apex of the frame and one of the supporting wheels for drawing the apex downward to raise the shovel, a rock lever mounted on the pivot of the triangular frame, a link connecting the rock lever with the arm of the shovel, a frame pivoted to the main frame, a link connecting one of the arms of said frame with the rock lever, a handle carried by said pivoted frame for shifting the same to rock the lever and thus the shovel, a curved trip lever pivoted to the handle and having a recessed lever end and a U member secured to the main frame for engagement by the recessed end of the curved trip lever to lock the pivot frame and thus the shovel in adjusted position.

In testimony whereof we affix our signatures, in presence of two witnesses.

ELMER BUTTS.
ALBERT BUTTS.

Witnesses:
F. H. PRESCOTT,
C. C. DYE.

Copies of this patent may be obtained for five cents each, by addressing the "Commissioner of Patents, Washington, D. C."